US010324158B2

(12) United States Patent
Wang et al.

(10) Patent No.: US 10,324,158 B2
(45) Date of Patent: Jun. 18, 2019

(54) ANGLE OF ARRIVAL DETECTION SYSTEM AND METHOD

(71) Applicant: Kabushiki Kaisha Toshiba, Tokyo (JP)

(72) Inventors: Stephen Wang, Bristol (GB); Dallan Byrne, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 321 days.

(21) Appl. No.: 15/357,976

(22) Filed: Nov. 21, 2016

(65) Prior Publication Data

US 2018/0143284 A1 May 24, 2018

(51) Int. Cl.
G01S 3/04 (2006.01)
G01S 3/74 (2006.01)

(52) U.S. Cl.
CPC .............. *G01S 3/74* (2013.01); *G01S 3/043* (2013.01)

(58) Field of Classification Search
CPC .................................. G01S 3/74; G01S 3/043
See application file for complete search history.

(56) References Cited

U.S. PATENT DOCUMENTS

2003/0063029 A1\* 4/2003 Ferreol ..................... G01S 3/74
342/440
2014/0327579 A1 11/2014 Hart et al.

FOREIGN PATENT DOCUMENTS

JP          2004112508 A  *  4/2004
WO     WO 2014/060777 A2     4/2014
WO     WO 2015/114313 A1     8/2015

OTHER PUBLICATIONS

English Translation of JP 2004112508 A. (Year: 2019).*
Xiong et al., "ArrayTrack: A Fine-Grained Indoor Location System," 10th USENIX Symposium on Networked Systems Design and Implementation (2013), pp. 71-84.
Cisco, "Hyperlocation Deployment Guide," White Paper (Nov. 2015), pp. 1-63.

* cited by examiner

*Primary Examiner* — Bernarr E Gregory
*Assistant Examiner* — Fred H Mull
(74) *Attorney, Agent, or Firm* — Finnegan, Henderson, Farabow, Garrett & Dunner, L.L.P.

(57) ABSTRACT

An apparatus comprising a plurality of receivers, a controller and memory storing instructions executable by the controller, the instructions, when executed by the controller causing the controller to receive data of signals received via the receivers as a signal from a transmitter, to segment the received data into a plurality of consecutive segments, to determine if consecutive data segments have changed in a manner indicative of movement of the transmitter and to, based on the determination, determine an angle of arrival of the signal based on data segments that have solely been received before or that have solely been received after a detected change in consecutive data segments indicative of movement of the transmitter or that have been received between two detected changes in consecutive data segments indicative of movement of the transmitter.

15 Claims, 9 Drawing Sheets

ANGLE OF ARRIVAL DETECTION SYSTEM AND METHOD

FIELD

Embodiments described herein relate generally to angle of arrival estimation.

BACKGROUND

Accurate localisation is important as a fundamental driver to facilitate many location-aware applications in different scenarios, from human or item tracking in commercial premises, drone tracking to industrial/domestic smart city/home, indoor robot and Internet of Things (IoT) navigation management. Localisation is one of the key technologies in autonomous mobile robot navigation and IoT-related applications where it is fundamental to route planning and avoidance obstacle of mobile IoTs. Indoor localisation is challenging.

Existing localisation technologies can be classified based on their data processing methods. Time of Arrival (ToA), Angle of Arrival (AoA) and Received Signal Strength (RSS) methods are known. Among these, AoA based technology is commonly employed. Such technology is, however, characterised by high computation complexity and susceptibility to erroneous localisation of mobile targets. The Multiple Signal Classification (MUSIC) algorithm in particular uses high computation complexity eigen decomposition operation intensively. In addition, hardware for performing known AoA methods can be costly. AoA estimation performance may also degrade with long processing time where the target has moved significantly.

BRIEF DESCRIPTION OF THE DRAWINGS

In the following, embodiments will be described with reference to the drawings in which.

DETAILED DESCRIPTION

Figure 1:
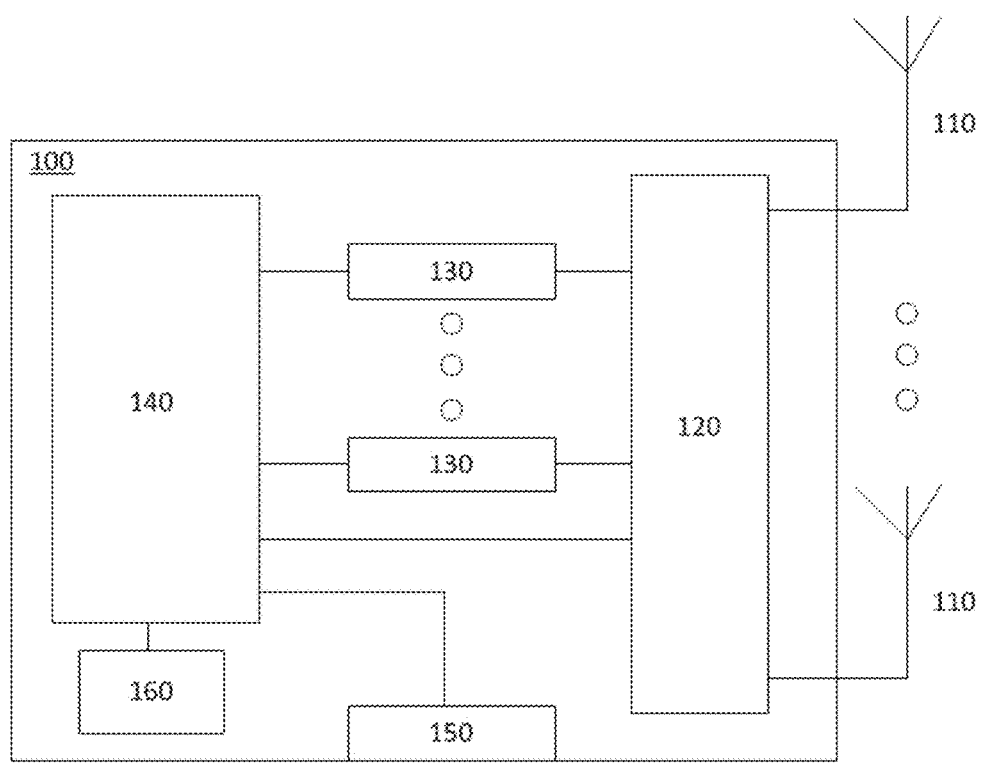
FIG. 1 shows a base station according to an embodiment.

In an embodiment there is provided an apparatus comprising a plurality of receivers, a controller and memory storing instructions executable by the controller, the instructions, when executed by the controller causing the controller to receive data of signals received via the receivers as a signal from a transmitter, segment the received data into a plurality of consecutive segments, determine if consecutive data segments have changed in a manner indicative of movement of the transmitter, based on the determination, determine an angle of arrival of the signal based on data segments that have solely been received before or that have solely been received after a detected change in consecutive data segments indicative of movement of the transmitter or that have been received between two detected changes in consecutive data segments indicative of movement of the transmitter. The angle of arrival may then be output.

The instructions, when executed by the controller, may further cause the controller to determine a segment length for segmenting the received data based on a position change frequency associated with the transmitter. This frequency can be a frequency indicating the likelihood of a particular transmitter will change position in a predetermined period of time or a frequency indicating the average likelihood of a transmitter within the sensitive area of the apparatus changing position. The change frequency is the frequency of change of the angle of arrival. Higher change frequency may cause the selection of shorter segments. Reducing segment length invariably means that more, shorter segments need to be processed. As the determination of whether or not consecutive data segments have changed in a manner indicative of movement of the transmitter can be done in a computationally very inexpensive manner. Repeating this computation more often is therefore not detrimental in terms of computing power used.

The instructions, when executed by the controller, can further cause the controller to decrease the segment length if the quality of the determined angle of arrival falls below a predetermined threshold. The controller may further be configured to determine the threshold on the basis of the angle-aware transmission quality. Specifically, if the antennae have been selected to provide sensitivity to a particular location in which the transmitter to be located is known or suspected to be located, movement of the transmitter can cause a rapid deterioration in transmission quality, measured, for example, an increase in detected transmission package error rate and/or bit error rate. In one embodiment the instructions, when executed by the controller, can further cause the controller to shorten segment length more readily than in a situation in which the antennae have not been selected to maximise specific location sensitivity.

The instructions, when executed by the controller, may cause the controller to determine if consecutive data segments have changed on the basis of the covariance matrices of the consecutive data segments.

The instructions, when executed by the controller, can cause the controller to determine if a trace difference between the covariance matrices of the consecutive data segments is above a predetermined trace difference threshold. By relying on the covariance matrix only to calculate a change in the angle of arrival of a signal (as opposed to the absolute angle of arrival) the need to use eigen decomposition of the signal covariance matrix in every processing step is avoided, thereby considerably reducing computational complexity and further allowing reduction in hardware complexity. A reduction of hardware complexity is further achieved by introducing spatial scalable antenna selection architecture while achieving the same antenna diversity using fewer RF chains.

The instructions, when executed by the controller, can cause the controller to choose the trace difference threshold on the basis of a trace differences fluctuation floor calculated over time.

The instructions, when executed by the controller, may cause the controller to determine the angle of arrival of the signal by combining data segments that have solely been received before or that have solely been received after a detected change in consecutive data segments indicative of movement of the transmitter or that have been received between two detected changes in consecutive data segments indicative of movement of the transmitter and by applying an angle of arrival determination method to the combined data segments.

The apparatus may comprise a number of antennae that exceeds the number of available receiver chains. The instructions, when executed by the controller, can cause the controller to select a number of antennae that corresponds to the number of available receiver chain. The selection may be random to increase diversity. In another embodiment the selection is made to steer a beam toward an area known to previously have comprised the transmitter.

According to an embodiment there is also provided a method performed in a controller of an apparatus that comprises a plurality of receivers. The method comprises receiving data of signals received via the receivers as a signal from a transmitter, segmenting the received data into a plurality of consecutive segments, determining if consecutive data segments have changed in a manner indicative of movement of the transmitter and, based on the determination, determining an angle of arrival of the signal based on data segments that have solely been received before or that have solely been received after a detected change in consecutive data segments indicative of movement of the transmitter or that have been received between two detected changes in consecutive data segments indicative of movement of the transmitter.

According to an embodiment there is further provided a data carrier comprising computer executable instructions for executing by a controller, the instructions, when executed by the controller, causing the controller to perform one or more or any of the aforementioned methods.

FIG. 1 shows an access point 100 comprising a number of antennas 110. The antennas are connected to a smaller number of receiver chains 130 by a switching network 120 that allows connecting any one of the antennas to any one of the receiver chains. The manner in which the switching network 120 connects the antennae 110 to the receiver chains 130 is determined by the controller 140 and the switching network 120 acts under the control of the controller 140, as indicated by the line connecting controller 140 with switching network 120. The controller 140 moreover determines the angle of arrival of a signal received by the antennae 110 in the manner described, with reference to an embodiment, in more detail below. Optionally the base station 100 comprises an input/output interface 150 that can be used to send information identifying the determined angle(s) of arrival to other/connected devices. It will of course be appreciated that this information may additionally or alternatively be transmitted using one or more of the antennae 110. The access point 100 further comprises non-volatile memory 160 in communicative connection with the controller 140. The memory 160 stores computer executable code that can be accessed by/transferred to the controller 140 and executed by the controller 140 to perform the method(s) described below.

Figure 2:
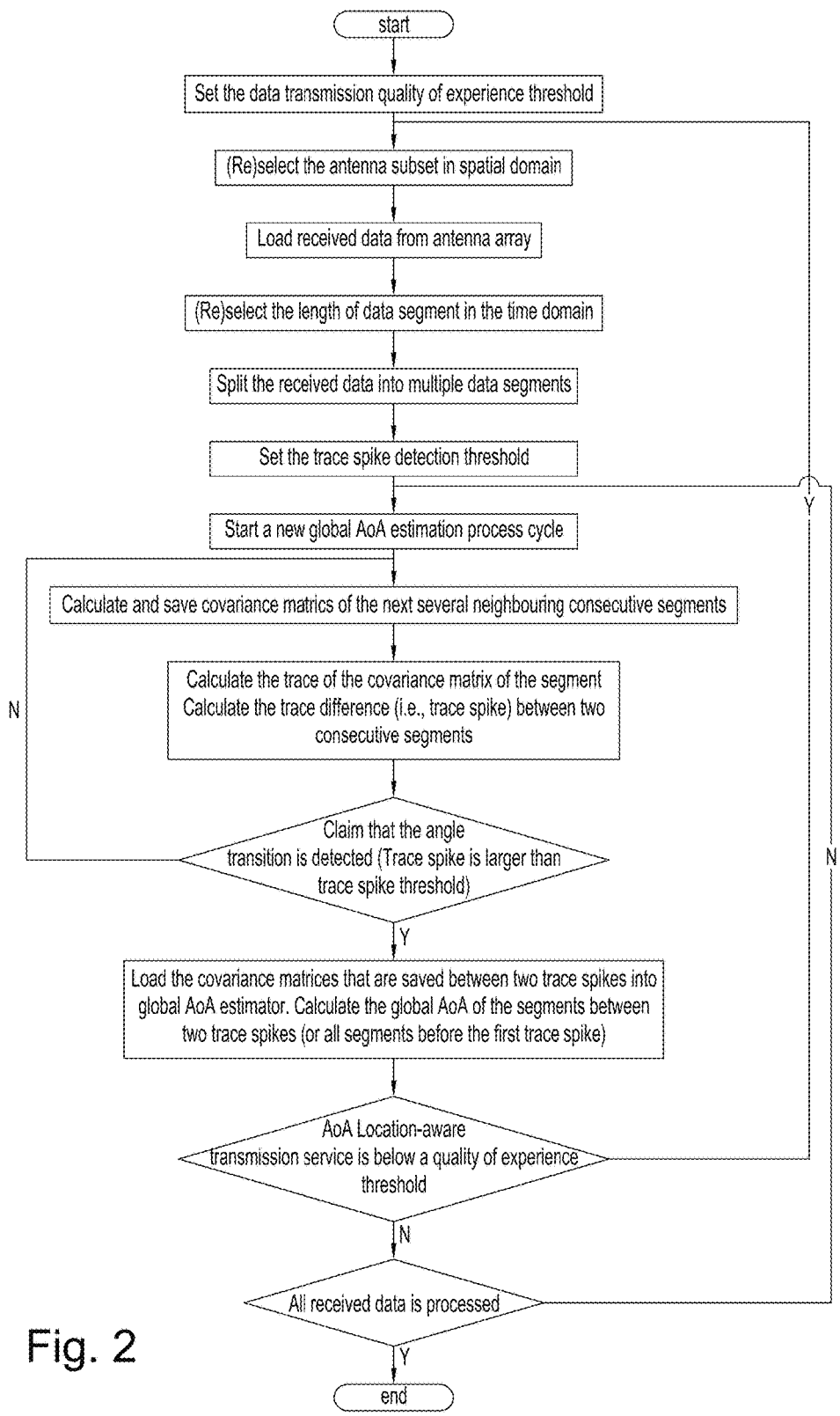
FIG. 2 shows a method of angle of arrival (AoA) determination according to an embodiment.

FIG. 2 illustrates a method of angle of arrival (AoA) determination according to an embodiment. After commencement of the method a data transmission quality of experience threshold is selected. This threshold may be a predetermined threshold that has been pre-programmed during factory setup of the access point and/or a threshold that has been determined during previous operation of the access point to provide satisfactory performance in terms of bit error rate and/or transmission package error rate. A number of antennae is then selected for AoA determination in the embodiment. The number of antennae selected may correspond to the number of available receiver channels. The antennae may be selected randomly. In an alternative embodiment the antennae are selected to steer the sensitivity of the selected antennae such as to maximise their sensitivity in an area in which the presence of a transmitter is suspected. The presence of a transmitter may be suspected in a particular area based on previous measurements.

Signals are then acquired by the controller using the selected antennae and the length N of the data segment to be considered is selected. As will become apparent in the later discussion, the longer the selected segment, the lower the computational complexity of determining the AoA. As will, however, be appreciated, that longer segments require longer to acquire, thereby increasing the risk of a transmitter to be located having changed location while the data was acquired. In one embodiment the length of the data sequence is constant. In another embodiment the segment length is shortened for later iterations of the method if it is found during one iteration that the accuracy of the determined angle is low. Alternatively or additionally the segment length N is selected based on known long term traffic behaviour of the transmitter, so that for an environment for which it is known that transmitter move readily the chosen segment length is shorter than for an environment in which, historically, less movement has been observed. The received data is then split into individual segments, each segment having the length N before the first AoA estimation process cycle is started and a trace spike detection threshold (the use of which is explained in more detail below) is set. This threshold may be a predetermined threshold that has been pre-programmed during factory setup of the access point and/or a threshold that has been determined during previous operation of the access point.

Each of the process cycles operates on two consecutive segments, so that, during the nth cycle the $n^{th}$ as well as the $(n+1)^{th}$ segment are processed. In the first cycle, for example, the first and second segment are processed and during the second cycle the second and third segment are processed. As a first step of the process cycle the respective covariance matrices of the first and second segments are calculated according to:

$$R_{curr} = \frac{1}{N} \sum_{n-N}^{n-1} x(n)x^H(n) \quad (1)$$

$$R_{last} = \frac{1}{N} \sum_{n-2N}^{n-N-1} x(n)x^H(n) \quad (2)$$

wherein $R_{curr}$ is the covariance matrix of the $(n+1)^{th}$ segment and $R_{last}$ is the covariance matrix of the $n^{th}$ segment, N is the segment length, x(n) is the nth data vector of the segment in question received through the selected antennae and H denotes the Hermitian transpose.

Once the covariance matrices are known, the trace difference for the calculated covariance matrices is calculated according to:

$$\text{Trace\_Difference} = \text{trace}((R_{curr} - R_{last})^H \times (R_{curr} - R_{last})) \quad (3)$$

wherein the trace of a matrix A is defined as:

$$\text{trace}(A) = \sum_{i=1}^{l} A_{ii} \quad (4)$$

wherein l is the number of rows of the matrix A.

The inventors have found that movement of a transmitter between segments causes the trace difference to increase. As a consequence the value of the trace difference can be used as an indicator of movement of the transmitter. By being able to determine that a transmitter has moved it is possible to separate data segments into those data segments that relate to one particular location of the transmitter and to those that relate to another location of the transmitter. As will be appreciated, if data received from the transmitter when located in two different locations were used jointly in determining the angle of arrival of the data, then the determined angle of arrival would be inaccurate or completely incorrect. By determining the segments between which the location of the transmitter has changed/the location of an increased trace difference (also referred to herein as a trace spike), the data segments relating to one transmitter location and those relating to the next transmitter location can be kept separate, thereby increasing the accuracy of the angle of arrival determination. The determination of the trace difference is computationally undemanding. As will be shown in more detail later, this compares favourably with other methods in which the angle of arrival is determined for each segment.

In the embodiment it is then determined if, for the two segments considered during the last iteration of the AoA estimation process cycle, the trace difference exceeds the trace spike threshold. Should this not be the case then the method returns to the beginning of the next AoA estimation process cycle and starts by calculating the covariance matrix for the next/newest segment. The previously calculated covariance matrix for the segment that was the newest considered segment in the previous iteration of the AoA estimation process cycle ($R_{curr}$ of this last cycle) may be re-used as $R_{last}$ of the current cycle.

If it is determined that a trace difference exceeds the trace spike detection threshold it is determined that the transmitter has likely moved and all segments preceding the trace spike and following the last previously detected trace spike (should there have been a previously detected trace spike; if not all segments since recording/data acquisition began may be used) are considered together as a single long segment for which the angle of arrival is calculated. This calculation can be made in the knowledge that movement of the transmitter is very unlikely to have taken place and that the resulting determined angle of arrival is likely very accurate.

The angle of arrival can be determine using an known method, for example the known Multiple Signal Classification (MUSIC) algorithm. MUSIC is a subspace Angle-of-Arrival (AOA) method. It exploits the eigen-structure of a covariance matrix, generated form the antenna array measurements to explore the orthogonality of the signal and noise subspaces. The N smallest eigenvalues $\{\lambda_{k+1}, \lambda_{k+2}, \ldots, \lambda_{k+N}\}$ and eigenvectors $U_N = \{u_{k+1}, u_{k+2}, \ldots, u_{k+N}\}$ of the covariance matrix R of the now created long segment are extracted and the music AOA spectrum can be computed as:

$$P = \frac{1}{a^H(\theta) U_N U_N^H a(\theta)}$$

where $$a^H(\theta) = \left[ 1, e^{-j\omega \frac{d\sin\theta}{c}}, e^{-j\omega \frac{2d\sin\theta}{c}}, \ldots, e^{-j\omega \frac{(N-1)d\sin\theta}{c}} \right]$$

is the array response vector (a.k.a, steering vector), d is the distance between two adjacent antennas and c is the signal propagation speed.

The maxima of the spectra are then used to determine the AoA. In known methods the eigenvalue decomposition required for determining the AoA in the above described manner needed to be performed repeatedly. In the embodiment the AoA determination needs to only be performed once between detected trace spikes. This may be after the second/terminating trace spike has been detected (in which case the AoA that has been determined only applies to the previous location of the transmitter) or at some time after the last trace spike, relying on segments received since the trace spike. In the embodiment eigenvalue decomposition only needs to be performed once in each global AoA estimation process cycle and the thus determined AoA can then be assumed to remain unchanged until the next trace spike is detected.

Returning to the setting of the trace spike threshold, whilst initially this threshold can be set in the manner described above, the threshold can be re-set (or set for the first time) to match the particular operating conditions of the access point. It will be appreciated that the trace difference fluctuates somewhat as a result of fluctuating measurement conditions, even if the transmitter does not move. The trace difference therefore exhibits behaviour that can be compared to the noise floor of a measured signal. In one embodiment the threshold for deciding whether or not a change in the trace difference (referred to in FIG. 2 as the trace spike threshold) is set with reference to the trace difference noise floor. In particular, trace spike threshold $\delta_T$ is calculates as below $$\delta_T = \alpha \frac{1}{P} \sum_{p=1}^{P} T_p \quad (5)$$

wherein $T_p$ is the trace difference. We choose $T_p$ (p=1, ... P) from the static trace difference in the initial stage assuming no angle change.

$$\frac{1}{P} \sum_{p=1}^{P} T_p$$

is used to calculate the trace difference noise floor. $\alpha$ is the threshold coefficient. For example, here we set $\alpha$=500, P=10, $$\frac{1}{P} \sum_{p=1}^{P} T_p$$

is calculated as $2.681*10^{-9}$. The trace spike threshold may be re-set after the detection of a trace spike or before or after re-selecting antennae.

Figure 3:
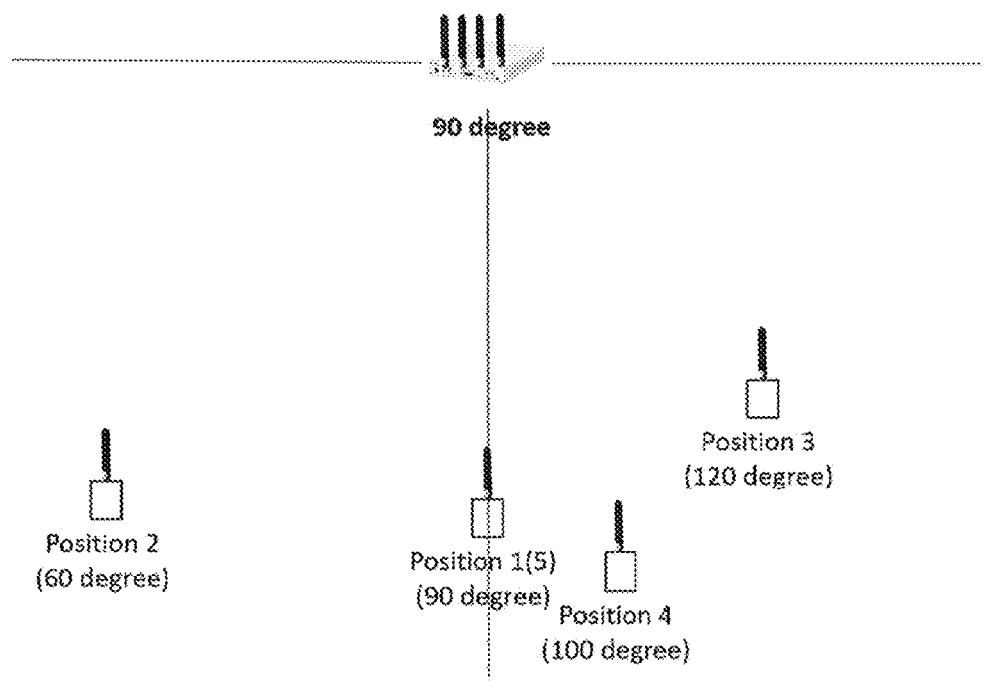
FIG. 3 shows a measurement setup in which a Bluetooth low energy transmitter is sequentially located in the indicated positions.
Figure 4A:
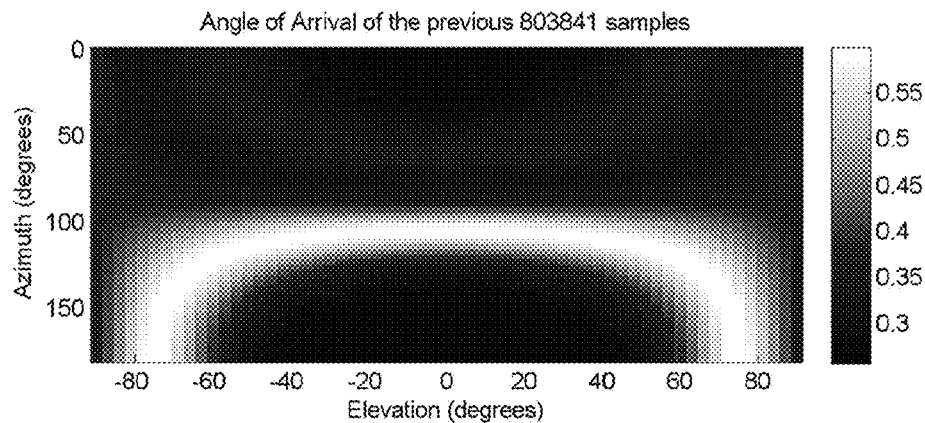
FIG. 4 shows the results of a benchmarking exercise, with A) showing the azimuth and elevation distribution of the angle of arrival of the stated data samples, B) the angle(s) of arrival determined therefrom using the known MUSIC technique and C) the signals received through the four receiver channels of the base station.
Figure 4B:
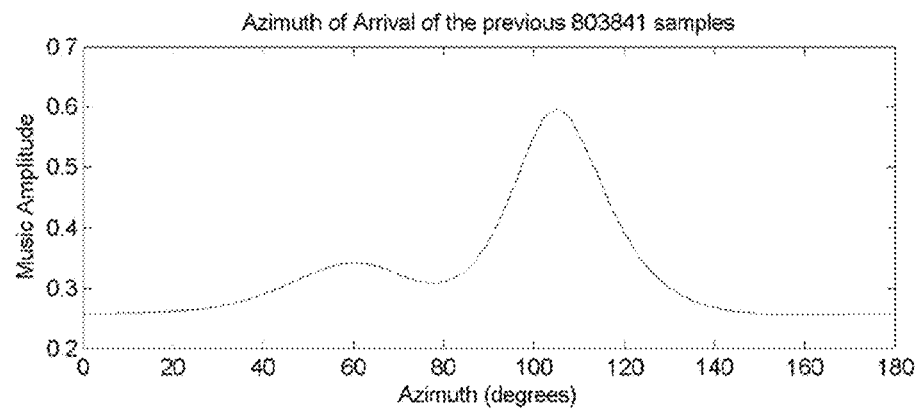
Figure 4C:
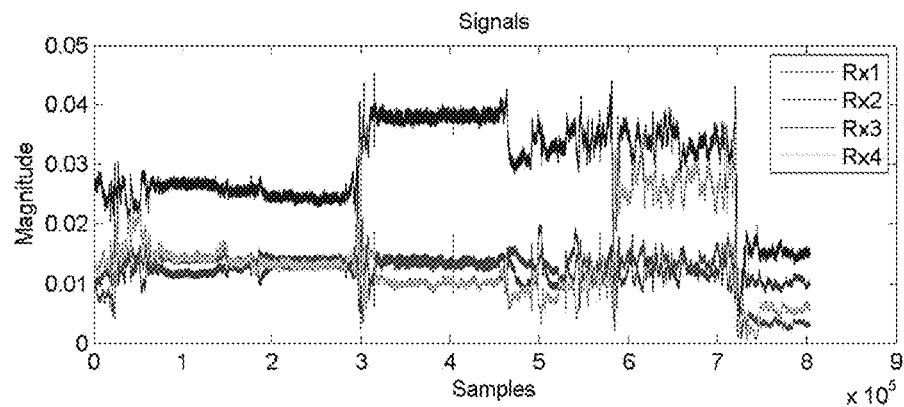

The embodiment was tested using a number of experiments. The experimental setup is shown in FIG. 3, in which the locations a Bluetooth low energy (BLE) transmitter was consecutively positioned in relative to a 4-antenna Uniform Linear Array (ULA) connected to four universal software radio peripherals (USRPs) is shown. An example AoA result of the MUSIC benchmark method using a fixed number of segments is given in FIG. 4. During the test, the target was moving from 90 degree to 60, 120, 100 degrees and move back to 90 degree in the end. This algorithm is unable to detect the movement of the target and instead outputs an incorrect AoA estimate of 106 degree. FIG. 4A) shows the MUSIC Azimuth and Elevation resolution. In this experiment, the ULA is aligned horizontally so that no elevation resolution can be determined. The use of a planar array, however, would help to resolve this to provide 2D AoA. FIG. 4B) shows the azimuth of arrival when the elevation is zero. The third row illustrates the magnitude of the four signals collected by the ULA.

As can be seen from FIG. 4B), the AoA determination is not correct (correct angles are: 90, 60, 120, 100, 90 degrees, but the benchmark method cannot identify the movement of the target and consequently combines irrelative angle information into a single one estimation cycle). This is because data segmentation has, due to the fixed segment length, not been able to take movement of the transmitter into account. The transmitter had been positioned at several different degrees throughout the signal capture time but FIG. 4 clearly show that the benchmark method cannot identify these changes of direction.

Results of the embodiment FIGS. 5 to 8. The change in transmitter location can be detected by examining the variance between consecutive segments. The trace of the difference metric for every segment (of 512 samples) is plotted in FIG. 5C) (and in FIGS. 6C), 7C) and 8C) for the other AoAs determined between the trace spikes identified in this manner). FIG. 5D) shows the raw signal. The signal is relatively stable as the considered signal is between trace spikes/does not include transmitter movement.

Rather than wait for a specified amount of time, it would be possible to perform AoA estimation on a per-segment basis (e.g. every 512 time samples). However, a considerable computational burden is associated with such an approach, particularly for small-scale hardware solutions, like a home router. The computational cost of performing an AoA estimate on a per-segment basis is shown in Table 1 where the total time taken for AoA estimation is almost 60 s on a four core Intel i5-4590 CPU at 3.20 GHz.

TABLE 1

Computational time from processing 1570 segments for a per-segment AoA method and the porposed technique.

| Per-segment Computational Time (Benchmark) | Proposed AoA Computational Time. |
|---|---|
| 1570 * (0.0382) = 59.97 s | (1570 * 0.000428) + (5 * 0.0377) = 0.86 s |

* 1570 is the number of segments.
* 0.0382 second is the time duration to calculate the covariance matrix and operate eigen decomposition for AoA estimate of each segment.
* 0.000428 second is the time duration to calculate the covariance matrix of each segment.
* 0.0377 second is the time duration to operate eigen decomposition for AoA estimate.

In contrast, the embodiment requires only 0.000428 s to check the temporal change in the environment and then a subsequent 0.0377 s to determine the AoA, when required. The total processing time for the examples using the embodiment is 0.86 s, almost 70 times lower than the per-segment technique.

Figure 5A:
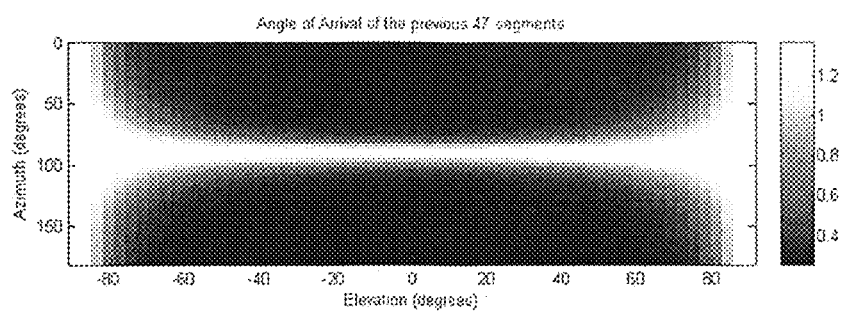
FIG. 5 shows A) the azimuth and elevation distribution of the angle of arrival of the stated data samples, B) the angle of arrival determined therefrom using the embodiment, C) the development of the trace difference over 47 segments (i.e., time segments acquired while the transmitter was in position 1) and D) the signals (in dash lines) received through the four receiver channels of the base station, segments in solid lines are those selected segments for AoA estimation of position 1.
Figure 5B:
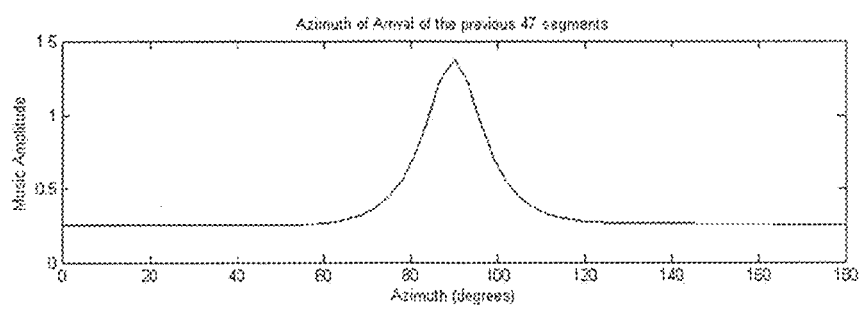
Figure 5C:
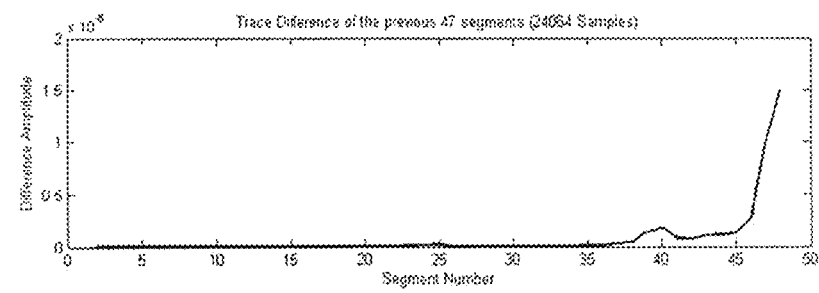
Figure 5D:
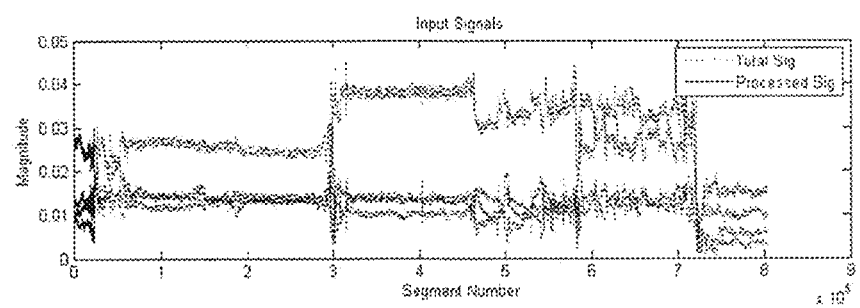

FIG. 5A) shows the angle of arrival elevation distribution for the transmitter in position 1 of FIG. 3. FIG. 5B) shows the correctly determined AoA using the embodiment and operating on data segments (in solid line) of FIG. 5D) received between the two detected trace spikes shown in FIG. 5C).

Figure 6A:
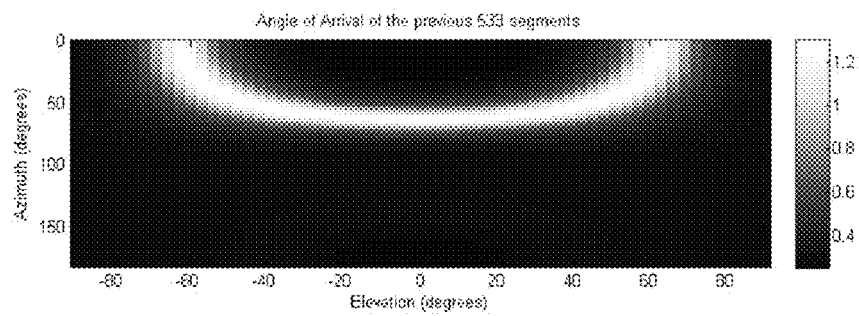
FIG. 6 shows A) the azimuth and elevation distribution of the angle of arrival of the stated data samples, B) the angle of arrival determined therefrom using the embodiment, C) the development of the trace difference over 533 segments (i.e., time segments acquired while the transmitter was in position 2) and D) the signals (in dash lines) received through the four receiver channels of the base station, segments in solid lines are those selected segments for AoA estimation of position 2.
Figure 6B:
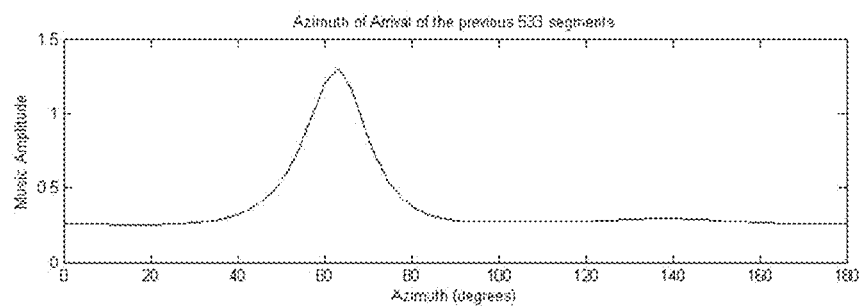
Figure 6C:
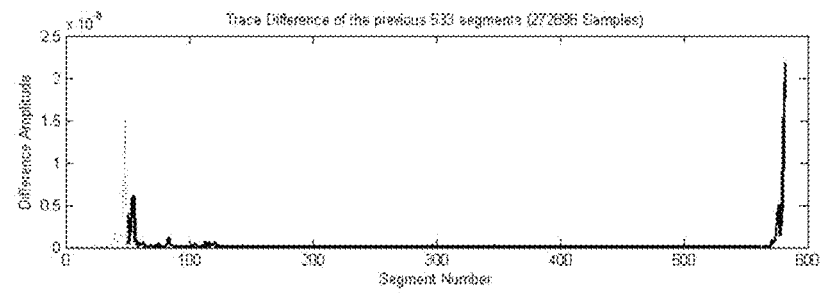
Figure 6D:
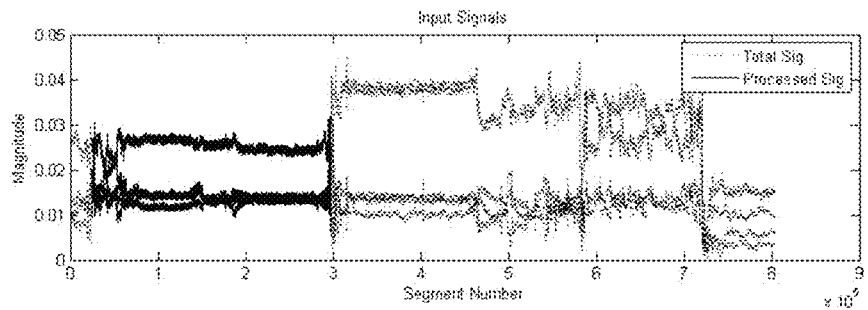

FIG. 6A) shows the angle of arrival elevation distribution for the transmitter in position 2 of FIG. 3. FIG. 6B) shows the correctly determined AoA using the embodiment and operating on data segments (in solid line) of FIG. 6D) received between the detected trace spikes shown in FIG. 6C).

Figure 7A:
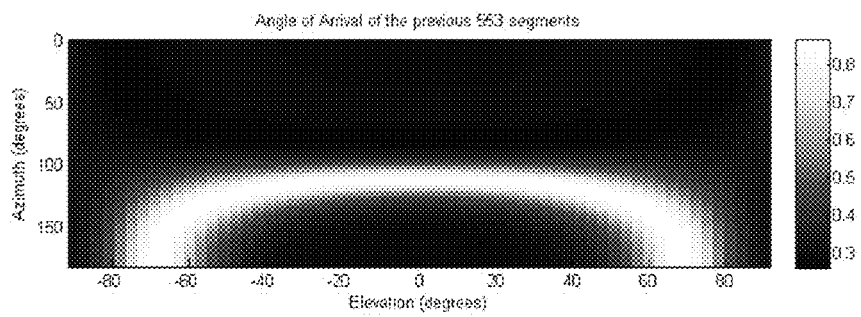
FIG. 7 shows A) the azimuth and elevation distribution of the angle of arrival of the stated data samples, B) the angle of arrival determined therefrom using the embodiment, C) the development of the trace difference over 553 segments (i.e., time segments acquired while the transmitter was in position 3) and D) the signals (in dash lines) received through the four receiver channels of the base station, segments in solid lines are those selected segments for AoA estimation of position 3.
Figure 7B:
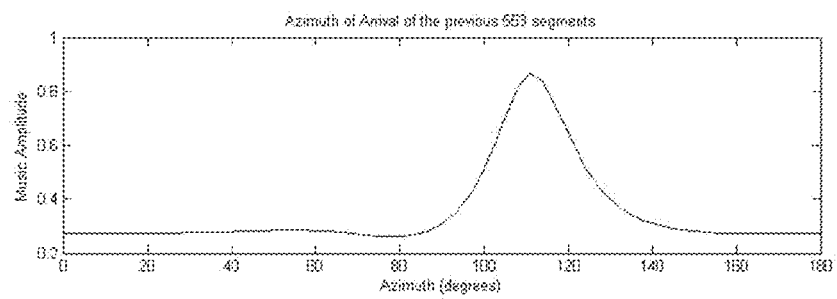
Figure 7C:
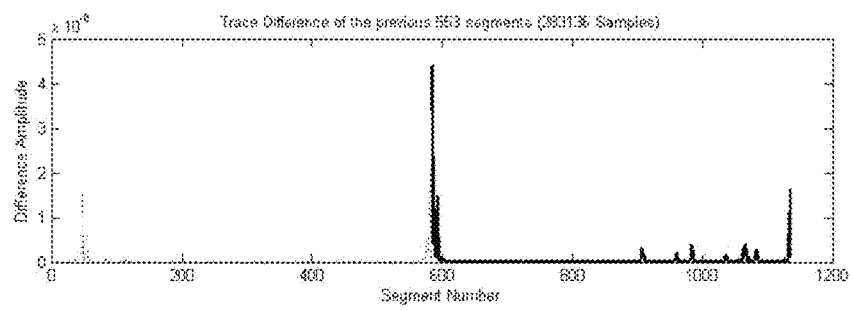
Figure 7D:
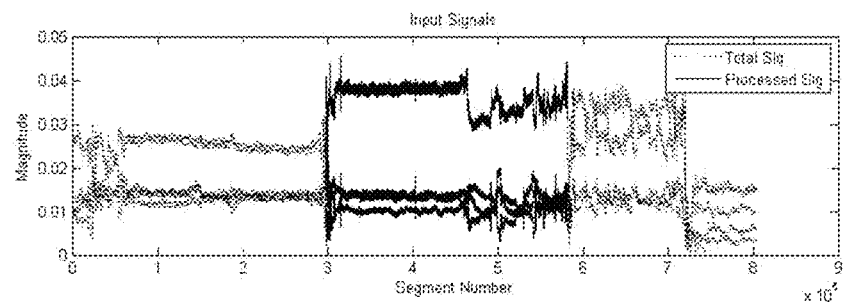

FIG. 7A) shows the angle of arrival elevation distribution for the transmitter in position 3 of FIG. 3. FIG. 7B) shows the correctly determined AoA using the embodiment and operating on data segments (in solid line) of FIG. 7D) received between the two detected middle and right-hand trace spikes shown in FIG. 7C) (the data between the left-hand and middle trace spike are the data shown in FIG. 6D)).

Figure 8A:
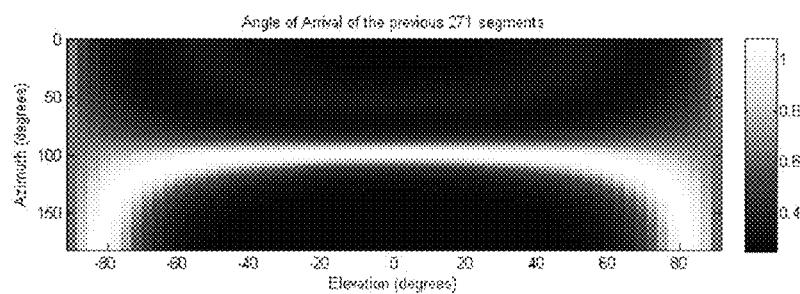
FIG. 8 shows A) the azimuth and elevation distribution of the angle of arrival of the stated data samples, B) the angle of arrival determined therefrom using the embodiment, C) the development of the trace difference over 271 segments (i.e., time segments acquired while the transmitter was in position 4) and D) the signals (in dash lines) received through the four receiver channels of the base station, segments in solid lines are those selected segments for AoA estimation of position 4.
Figure 8B:
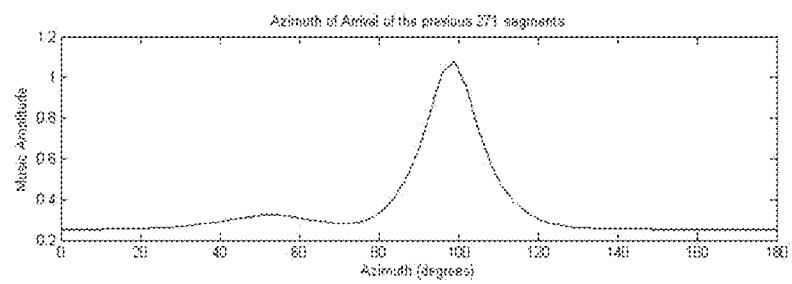
Figure 8C:
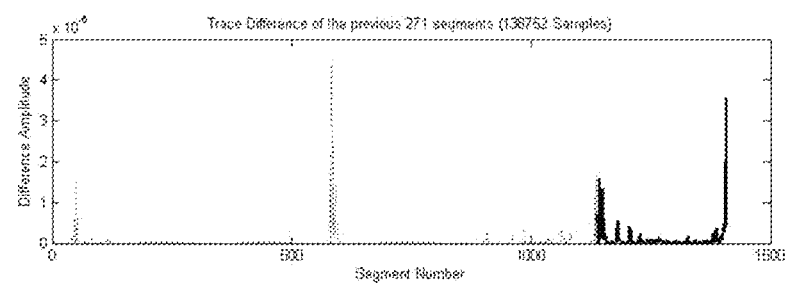
Figure 8D:
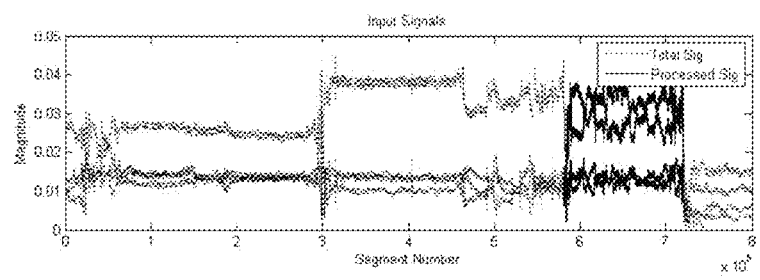

FIG. 8A) shows the angle of arrival elevation distribution for the transmitter in position 4 of FIG. 3. FIG. 8B) shows the correctly determined AoA using the embodiment and operating on data segments (in solid line) of FIG. 8D) received between the two rightmost detected trace spikes shown in FIG. 8C).

Figure 9A:
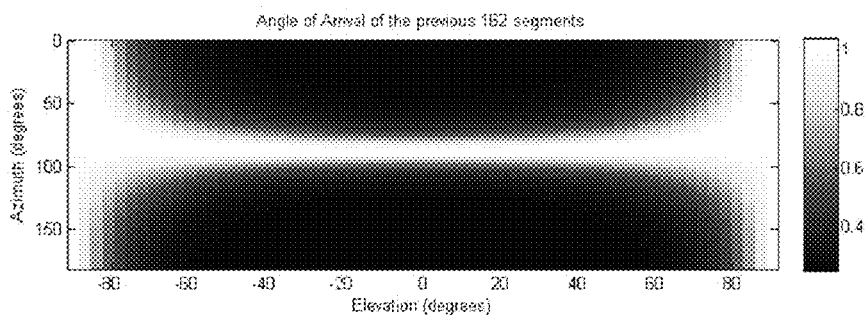
FIG. 9 shows A) the azimuth and elevation distribution of the angle of arrival of the stated data samples, B) the angle of arrival determined therefrom using the embodiment, C) the development of the trace difference over 162 segments (i.e., time segments acquired while the transmitter was in position 5) and D) the signals (in dash lines) received through the four receiver channels of the base station, segments in solid lines are those selected segments for AoA estimation of position 5 (where the transmitter returns to position 1).
Figure 9B:
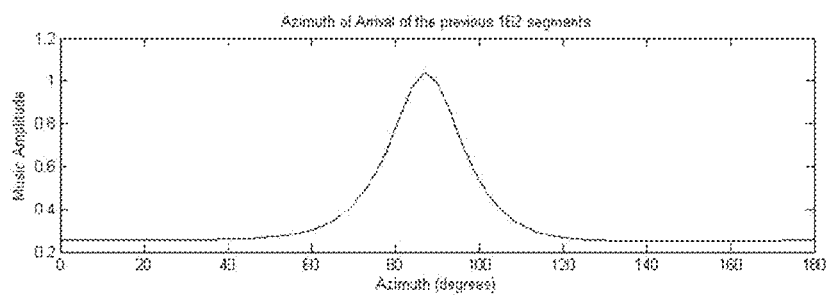
Figure 9C:
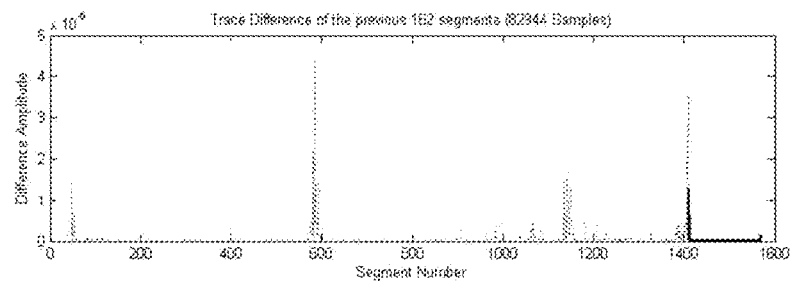
Figure 9D:
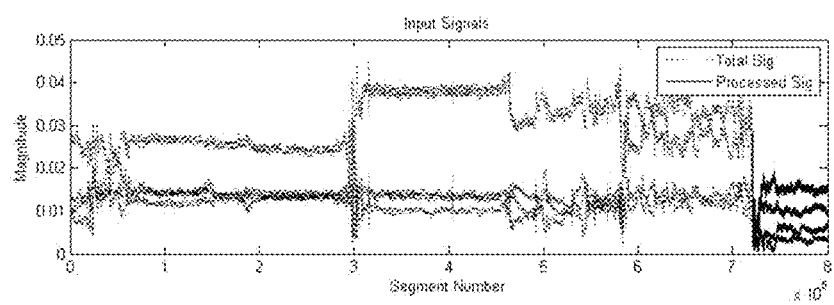

FIG. 9A) shows the angle of arrival elevation distribution for the transmitter in position 5 (same as position 1) of FIG. 3. FIG. 9B) shows the correctly determined AoA using the embodiment and operating on data segments (in solid line) of FIG. 9D) received after the last detected trace spikes shown in FIG. 9C).

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An apparatus comprising a plurality of receivers, a controller and memory storing instructions executable by the controller, the instructions, when executed by the controller causing the controller to:
   receive data of signals received via the receivers as a signal from a transmitter;
   segment the received data into a plurality of consecutive segments;
   determine if consecutive data segments have changed in a manner indicative of movement of the transmitter;
   based on the determination, determine an angle of arrival of the signal based on data segments that have solely been received before or that have solely been received after a detected change in consecutive data segments indicative of movement of the transmitter or that have been received between two detected changes in consecutive data segments indicative of movement of the transmitter.

2. An apparatus according to claim 1, wherein the instructions, when executed by the controller, further cause the controller to determine a segment length for segmenting the received data based on a position change frequency associated with the transmitter.

3. An apparatus according to claim 1, wherein the instructions, when executed by the controller, further cause the controller to decrease the segment length if the quality of the determined angle of arrival falls below a predetermined threshold.

4. An apparatus according to claim 1, wherein the instructions, when executed by the controller, cause the controller to determine if consecutive data segments have changed on the basis of the covariance matrices of the consecutive data segments.

5. An apparatus according to claim 4, wherein the instructions, when executed by the controller, cause the controller to determine if a trace difference between the covariance matrices of the consecutive data segments is above a predetermined trace difference threshold.

6. An apparatus according to claim 5, wherein the instructions, when executed by the controller, cause the controller to choose the trace difference threshold on the basis of a trace differences fluctuation floor calculated over time.

7. An apparatus according to claim 1, wherein the instructions, when executed by the controller, cause the controller to determine the angle of arrival of the signal by combining data segments that have solely been received before or that have solely been received after a detected change in consecutive data segments indicative of movement of the transmitter or that have been received between two detected changes in consecutive data segments indicative of movement of the transmitter and by applying an angle of arrival determination method to the combined data segments.

8. A method performed in a controller of an apparatus that comprises a plurality of receivers, the method comprising:
   receiving data of signals received via the receivers as a signal from a transmitter;
   segmenting the received data into a plurality of consecutive segments;
   determining if consecutive data segments have changed in a manner indicative of movement of the transmitter; and
   based on the determination, determining an angle of arrival of the signal based on data segments that have solely been received before or that have solely been received after a detected change in consecutive data segments indicative of movement of the transmitter or that have been received between two detected changes in consecutive data segments indicative of movement of the transmitter.

9. A method according to claim 8, further comprising determining a segment length for segmenting the received data based on a position change frequency associated with the transmitter.

10. A method according to claim 8, further comprising decreasing the segment length if the quality of the determined angle of arrival falls below a predetermined threshold.

11. A method according to claim 8, further comprising determining if consecutive data segments have changed on the basis of the covariance matrices of the consecutive data segments.

12. A method according to claim 11, further comprising determining if a trace difference between the covariance matrices of the consecutive data segments is above a predetermined trace difference threshold.

13. A method according to claim 12, further comprising choosing the trace difference threshold on the basis of a trace differences fluctuation floor calculated over time.

14. A method according to claim 8, further comprising determining the angle of arrival of the signal by combining data segments that have solely been received before or that have solely been received after a detected change in consecutive data segments indicative of movement of the transmitter or that have been received between two detected changes in consecutive data segments indicative of movement of the transmitter and by applying an angle of arrival determination method to the combined data segments.

15. A non-transitory data carrier comprising computer executable instructions for executing by a controller, the instructions, when executed by the controller, causing the controller to perform a method comprising:
   receiving data of signals received via the receivers as a signal from a transmitter;
   segmenting the received data into a plurality of consecutive segments;
   determining if consecutive data segments have changed in a manner indicative of movement of the transmitter; and
   based on the determination, determining an angle of arrival of the signal based on data segments that have solely been received before or that have solely been received after a detected change in consecutive data segments indicative of movement of the transmitter or that have been received between two detected changes in consecutive data segments indicative of movement of the transmitter.

\* \* \* \* \*